United States Patent [19]
Taylor

[11] Patent Number: 4,633,817
[45] Date of Patent: Jan. 6, 1987

[54] PROTECTIVE FOOTWEAR FOR ANIMALS

[76] Inventor: Jackson H. Taylor, 467 Hill Street, Green Lake, Wis. 54941

[21] Appl. No.: 626,933

[22] Filed: Jul. 2, 1984

[51] Int. Cl.$^4$ .............................................. A01K 13/00
[52] U.S. Cl. ........................................... 119/96; 54/79
[58] Field of Search .......................... 119/1, 96; 54/79; 36/111, 10, 7.1 R, 9 R

[56] References Cited
U.S. PATENT DOCUMENTS

| | | | |
|---|---|---|---|
| 2,222,705 | 11/1940 | Conlon | 54/79 |
| 2,443,831 | 6/1948 | Miller | 54/79 |
| 2,534,727 | 12/1950 | Moyle | 54/71 |
| 2,541,020 | 2/1951 | Arnold | 36/9 |
| 3,742,679 | 7/1973 | Jordan | 54/79 |

Primary Examiner—Hugh R. Chamblee
Attorney, Agent, or Firm—Donald Cayen

[57] ABSTRACT

Protective footwear for animals includes a suspender system for retaining two-piece bootees on the animal's feet. The bootee comprises a sock of warm and comfortable yarn which is inserted into and joined to a boot of deerskin. A buckle is secured to each sock for receiving a strap of the suspender system. The suspender system may be fabricated as a pair of elastic ribbons draped over the animal's shoulders and hindquarters and joined by an adjustable strap running along the animal's back.

16 Claims, 7 Drawing Figures

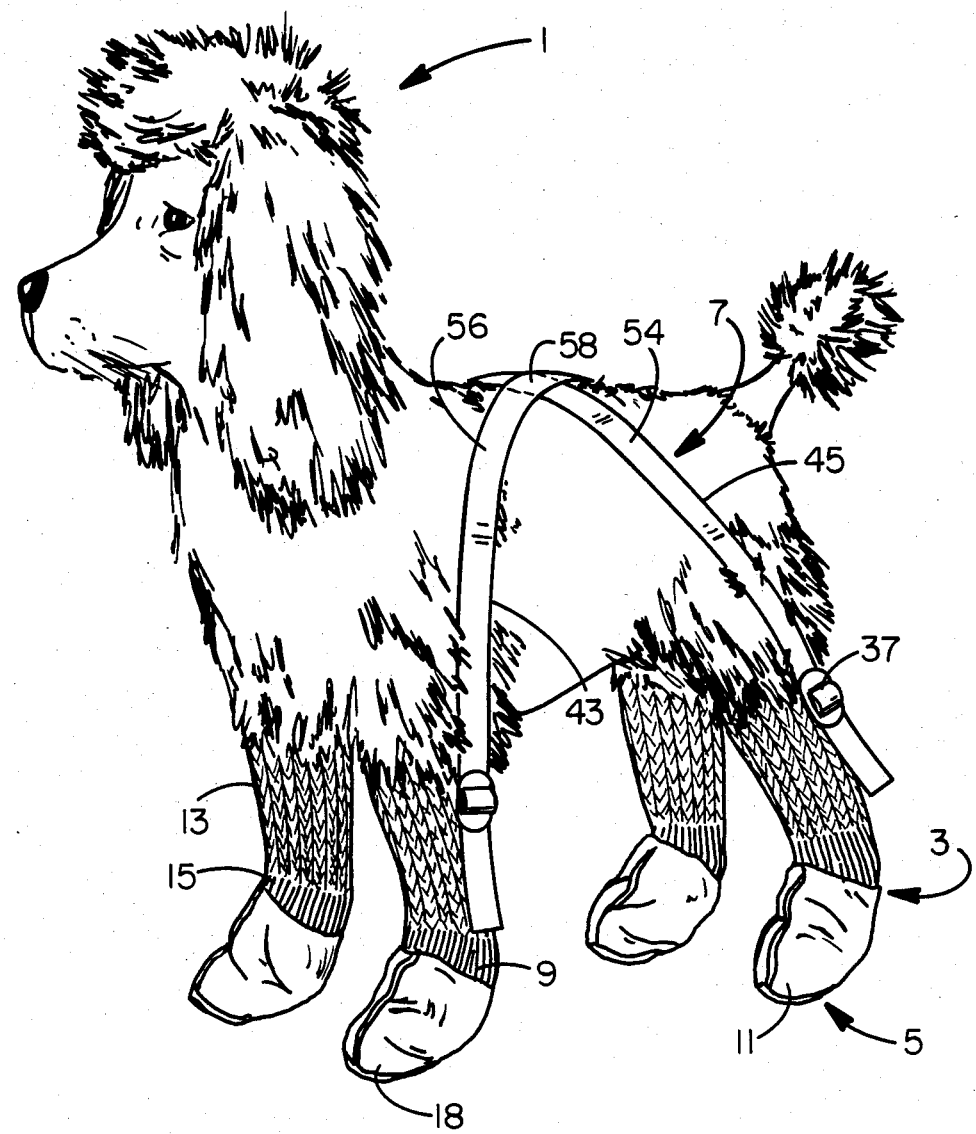

PROTECTIVE FOOTWEAR FOR ANIMALS

BACKGROUND OF THE INVENTION

1. Field of the Invention

This invention pertains to animal footwear, and more particularly to protective footwear for animals having support means for holding the footwear in place.

2. Description of the Prior Art

Various devices have been developed to protect the feet and legs of work and pet animals from the elements, and also for use as therapeutic and restraining devices. For example, U.S. Pat. Nos. 601,974 and 2,253,837 disclose boots for therapeutic use, each designed to hold liquids and medicines and which are held in place by either straps or a harness arrangement respectively, but preferably with no movement of the animal and are clearly designed for use primarily with horses. U.S. Pat. No. 3,747,565 discloses a boot intended as a restraining device for use while grooming the animal and to protect the groomer from being injured by the animal's claws and is clearly designed for use by animals such as cats. The boot is held in place by a net-like sleeve terminating in tie strings which tie over the animal's back. It is clear that the boots and sleeves are not intended for walking or other normal animal functions.

It is well known that the feet and legs of dogs are especially vulnerable to snow, ice, the salt and chemicals used to melt such ice, rough ground, and hot pavement. U.S. Pat. Nos. 2,064,566, 2,424,172, 2,446,371, 2,535,394, 2,651,853, and 3,209,726 all disclose variations of form fitting, molded, and other boots most of which are meant to fit snugly in an attempt to prevent slipping off and many having local means of securing such as surrounding straps, laces, adhesive tape, zippers, etc., and all of which might possibly cut circulation and/or cause discomfort due to their binding effect on the feet and legs. None of the previously mentioned, however, present a satisfactory method of retaining the boot on the dog's foot, part of the problem being that, unlike a human's foot, a dog's foot does not form a definite right angle to its leg, and has no heel, both of which are extremely critical to successfully retain a boot with only local means of securing. Many of the aforementioned boots offer openings for ventilation or for allowing the dogs' toes to protrude which defeat the purpose of protection from the elements.

U.S. Pat. No. 3,762,073 displays a disposable dog legging made from heat sealable thermoplastic material which again might possibly cause binding because of its securing straps and fail to insulate from the cold as cold plastic adds to the discomfort and becomes very stiff and unpliable when cold which can even cause cracking or tearing.

Thus, a need exists for animal footwear which is durable and comfortable, and which remains in place for extended periods of vigorous activity.

SUMMARY OF THE INVENTION

In accordance with the present invention, warm and comfortable protective animal footwear is provided which is capable of being worn for extended periods without coming off the animal's feet and which requires no binding in fit, binding fasteners, and is totally enclosed to keep out the irritating elements. This is accomplished by apparatus which includes durable bootees in combination with supporting suspenders.

The bootees are preferably of two-piece construction. The first piece is a sock of flexible material and of sufficient size and length to fit over the paw of the animal, such as a dog, and to extend above its knees. The second piece is a relatively short boot of flexible but durable material which encases and is joined to the lower portion of the sock so as to substantially surround the dog's paw. The sock is preferably made of a warm and knittable yarn. The boot is preferably made of deerskin, and the boot may be joined to the sock by sewing, or bonding.

The upper end of the sock is provided with a buckle or similar adjustable fastening device, as for example, a Velcro fastener. To hold the bootees in place on the animal's foot, the present invention includes a suspender system. In the preferred embodiment, the suspender system comprises a first strap which drapes over the animal's back at the shoulder, the ends of which are received in the buckles of the socks on the dog's front feet. A second strap is similar to the first, but it drapes over the dog's hindquarters to fasten to the buckles of the socks on the rear feet. A third set of straps entwined in a buckle to become one of adjustable length extends longitudinally along the dog's back and joins the two draped straps. The suspender straps are preferably made of an elastic material.

To suit breeds of dogs having very sloping hindquarters, the suspender system includes an optional securing strap for attaching to the dog's collar to prevent the possibility of the suspender system slipping off the dog's hindquarters.

The protective footwear of the present invention may be modified to suit different size dogs. For example, manufacturing considerations may preclude sewing a full sock to the boot in sizes suitable for very small dogs. In that situation, the sock does not extend to cover the dog's paw, but rather it terminates at the junction with the boot, to which it is sewn in a fashion generally similar to the larger size bootee.

Other objects and advantages of the invention will become apparent from the disclosure.

BRIEF DESCRIPTION OF THE DRAWINGS

FIG. 7 is a modified suspender system.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined the claims appended hereto.

Figure 1:
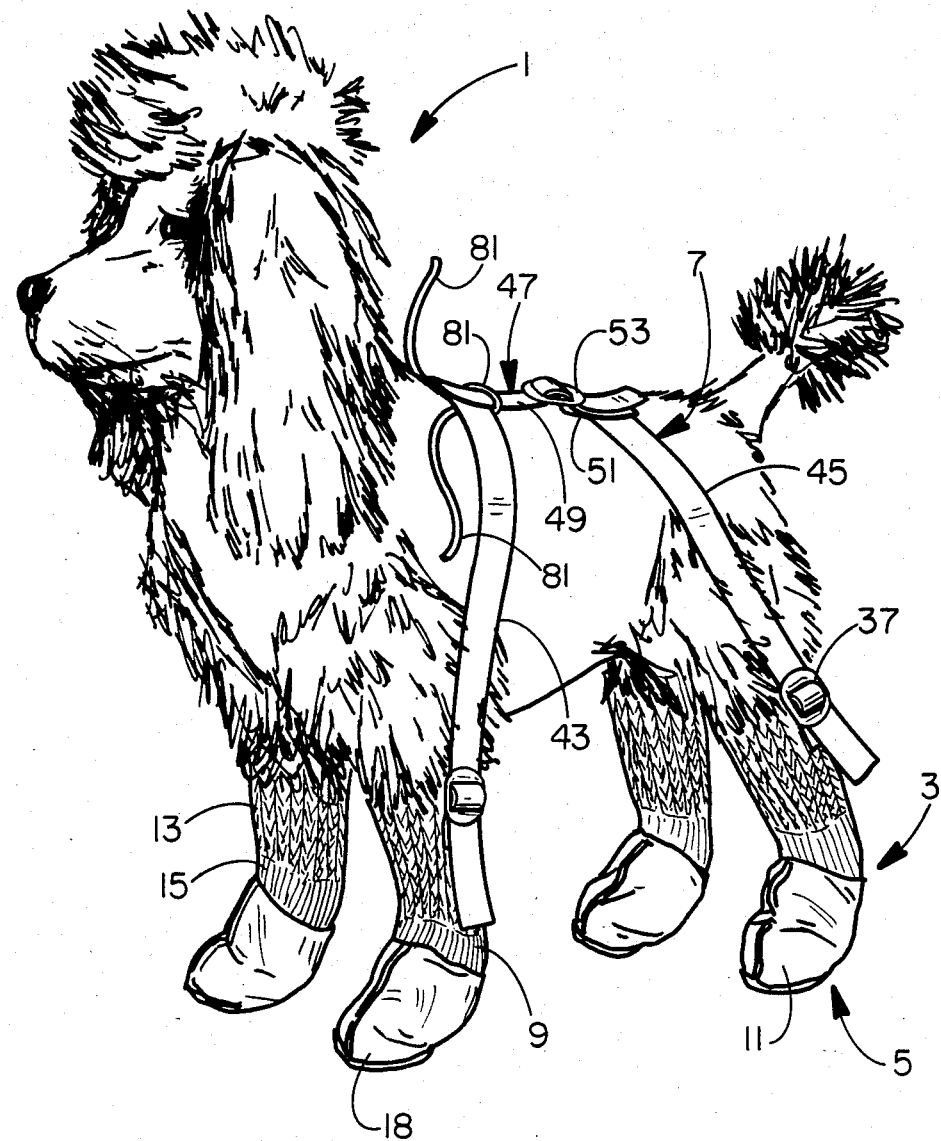
FIG. 1 is a perspective view of a dog wearing the protective footwear with suspender system of the present invention.

Referring to FIG. 1, an animal 1 is illustrated which is wearing the protective footwear 3 of the present invention. The protective footwear finds particular usefulness for protecting and insulating the feet and legs of pet dogs from snow, ice, the salt and chemicals used to melt such ice, rough terrain, and hot pavement, or sand, and for keeping the dog's feet and legs clean to protect against soiling carpets, etc. However, it will be understood that the invention is not limited to outdoor applications.

The protective footwear 3 includes a plurality of bootees 5 joined to a suspender system 7. The bootees are substantially identical, so that the description of one is believed to be sufficient. Each bootee 5 is composed of a flexible sock 9 and a flexible boot 11. The sock 9 is preferably of an extra close knit construction and made from high bulk yarn. The sock has no heel, but rather it is of the tube type. The upper portion 13 is ribbed vertically, and the yarn thereat includes rubberized elastic for gently embracing the dog's leg. The lower portion 15 of the sock is of standard knit construction and terminates in a "fish-mouth" toe 16 formed by stitchings 17, FIG. 2. The length of the sock is such as to extend well above the dog's knee and preferably to the "legpit." That length is important to minimize flexing of the suspender system as the dog is walking, as will be explained hereinafter. The sock yarn may be of any suitable material, but an Orlon/Nylon combination is a preferred material, because it is warm, resilient, dyes easily, and retains dye when wet.

Figure 3:
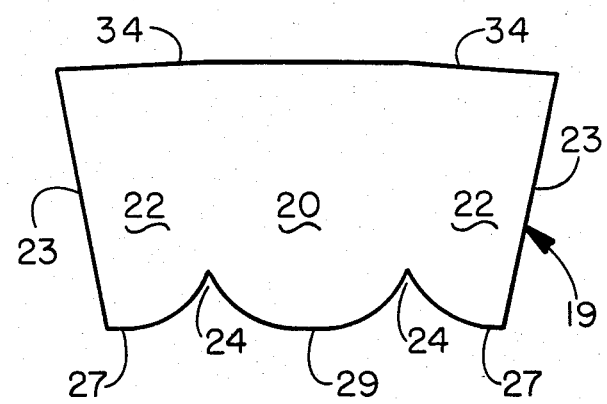
FIG. 3 is a view of a blank of material in the unrolled position for fabricating the boot of the present invention.
Figure 4:
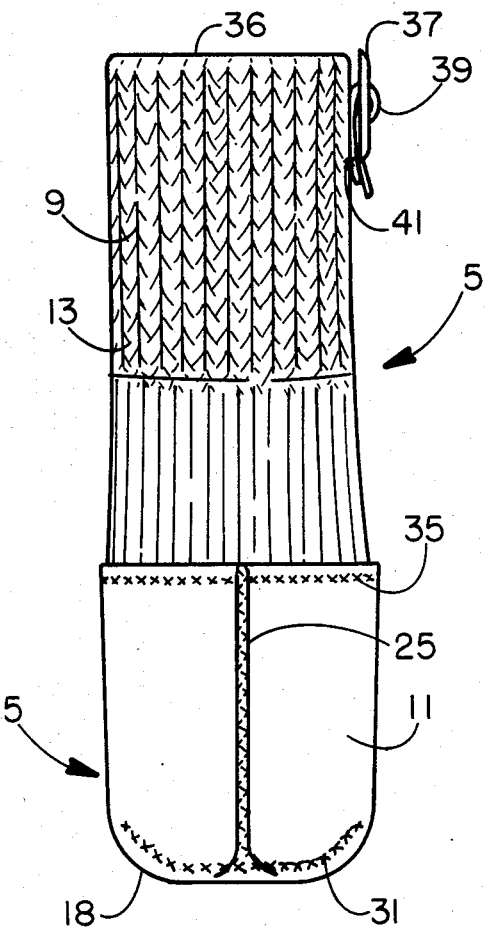
FIG. 4 is a front view of the bootee of the present invention.

Illustrated in FIG. 3 is a blank 19 from which the boot 11, FIG. 1, is made. The blank 19 has a central panel 20 and a pair of symmetrical side panels 22. In the preferred embodiment, the side edges 23 of the side panels 22 converge downwardly. To provide a rounded contour and a pleasing appearance to the toe end 18 of the finished boot, FIG. 4, the blank may be scalloped at 24 along the lower margins 27 and 29 of the side and end panels, respectively. The top margins 34 of the side panels may slope downwardly toward the side edges 23. The blank is rolled so that the two side edges 23 abut, and the edges 23 are sewn together along external stitch line 25 to create a frusto-conical band of material. The lower margins 27 of the side panels are then sewn to central margin 29 along stitch lines 31 to create the open top downwardly converging boot 11. The frusto-conical shape of the boot reduces the amount of material at the front corners of the boot, FIG. 1, thereby preventing them from turning under while the dog is walking which could cause him to stumble. The tapered margins 34 further reduce the bulk of folded boot material on the top side of the boot and dog's foot thereby enhancing comfort.

The boot material is preferably deerskin. That material is very soft, flexible, and comfortable to the dog's foot. Deerskin may be washed, and when dried it does not become stiff or brittle. To provide increased traction on icy surfaces, a sueded side of the deerskin is placed to the outside.

Figure 2:
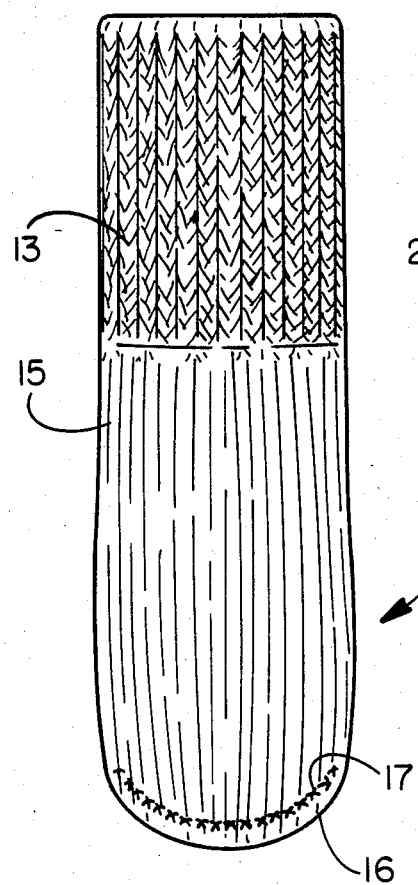
FIG. 2 is a front view of the sock which forms a portion of the present invention.

After the blank 19, FIG. 3, has been converted into the open top boot 11, the sock 9, FIG. 2, is inserted into the boot until the toe 16 contacts the stitch line 31. Then the boot and sock are joined, as by sewing, along stitch line 35, FIG. 4, to form a unitary bootee 5 having a warm and comfortable liner provided by the sock and a tough but flexible and comfortable outer boot 11.

Near the top edge 36 of the sock 9 is fastened an adjustable fastener. In the illustrated construction, the fastener is a buckle 37. To prevent contacting and irritating the dog's skin, the greater portion of the buckle 37 is located below the top edge 36. The buckle is preferably fastened by means of a short loop 39 of elastic material wrapped around the center bar of the buckle and sewn to the sock at stitch line 41. The buckle need not have a tung, but it should have teeth on each outside bar to retain position of the elastic suspenders. Bootees 5 are either right or left hand, and that is determined by the side of the bootee on which the buckle is sewn.

To hold the bootees 5 in place on the dog's feet and legs, the protective footwear 3 of the present invention includes the suspender system 7, FIG. 1. Due to this feature the boots can be made to fit more loosely and therefore more comfortably than previous footwear and allow natural expanding of the feet and toes while walking. Also, due to this feature, they require no binding straps, tape, or other fasteners to cut circulation or otherwise cause discomfort. In the illustrated instruction, the suspender system 7 is composed of a pair of substantially identical front and back straps 43 and 45, respectively. The straps 43 and 45 are adapted to drape over the dog's shoulders and hindquarters, respectively. The free end of each strap is inserted into the corresponding bootee buckle 37, thereby permitting the custom fitting of the suspender system to the dog. The relatively long lengths of the socks 9 permit fastening the straps 43 and 45 only slightly below the respective shoulders. Consequently, the amount of strap flexing due to walking is minimized, and the straps keep the bootees securely in place. The straps 43 and 45 are joined by an adjustable strap 47 which, when the suspender system is in place on the dog, extends longitudinally along the dog's back. The strap 47 may consist of a short strap 49 fastened to the front strap 43, as by sewing, and a second shorter strap 51 fastened at one end to the back strap 45 and terminating in a loop enclosing the center bar of buckle 53. Inserting the free end of the first strap 49 into the buckle 53 permits adjustment of the strap 47 to suit the spread between the dog's front and hind legs and the shorter rear section positions the buckle over the most comfortable position of the dog's back.

The preferred material for the suspender system straps is a soft and readily expandable elastic, such as pajama elastic. That material does not irritate the dog's skin nor apply excessive pressure on its toes and claws. Elastic belting of various widths depending on the size dog the particular model is intended for has been found to be satisfactory. To enhance the attractiveness of the protective footwear of the present invention, the various components may be color coordinated.

The present invention contemplates utilizing a conventional body enircling, leash type harness as a portion of the suspender system 7 for retaining the bootees 5 on the dog's front legs. In that case, an elastic strap generally corresponding to strap 43 may be joined to each side of the harness by any suitable means, and the free ends of the straps are adjustably received in the corresponding buckles 37.

The present invention contemplates the employment of a harness for encircling the dog's hindquarters, such as is disclosed in U.S. Pat. No. 2,190,115, as a portion of the suspender system 7 for retaining the bootees 5 on the hind feet. In that situation, an elastic strap generally corresponding to strap 45 is suitably fastened on each side of the harness, and the free end thereof is adjustably received in the buckle 37 of the corresponding sock.

The present invention furter contemplates utilizing the straps or other portions of a protective cover, such as is disclosed in U.S. Pat. No. 2,539,606, as a portion of the suspender system 7. In that case, elastic straps generally corresponding to both or either straps 43 and 45 are suitably joined to the protective cover, and the free end of the straps are adjustably received within the corresponding buckles 37 on either or both the front and hind feet.

A modified version of the suspender system could exist where only two straps would be used. Referring to FIG. 7, a pair of substantially identical straps 54 and 56 cross in an x configuration and would be fastened at the point 58 at which one strap overlapped the other and each of the four strap ends would be received by a buckle 37 at its corresponding bootee.

Figure 5:
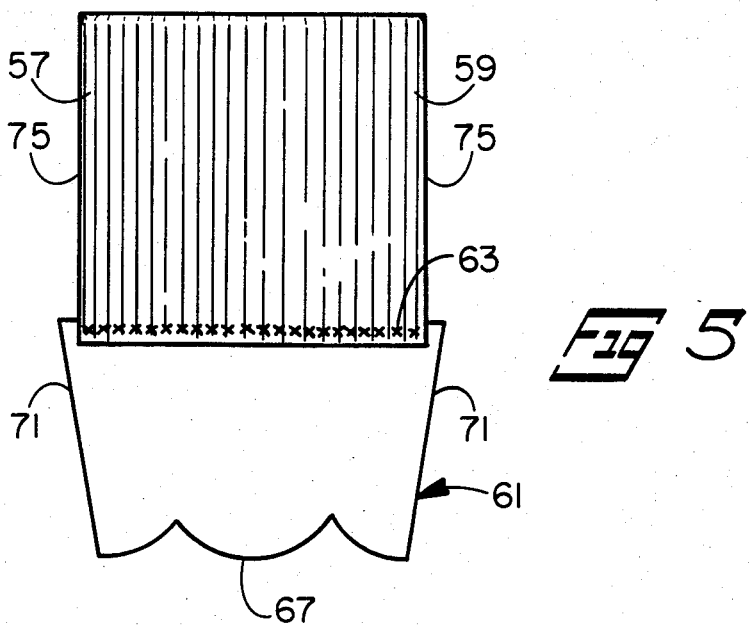
FIG. 5 is a view of a blank of material in the unrolled position from which a modified bootee of the present invention is made.
Figure 6:
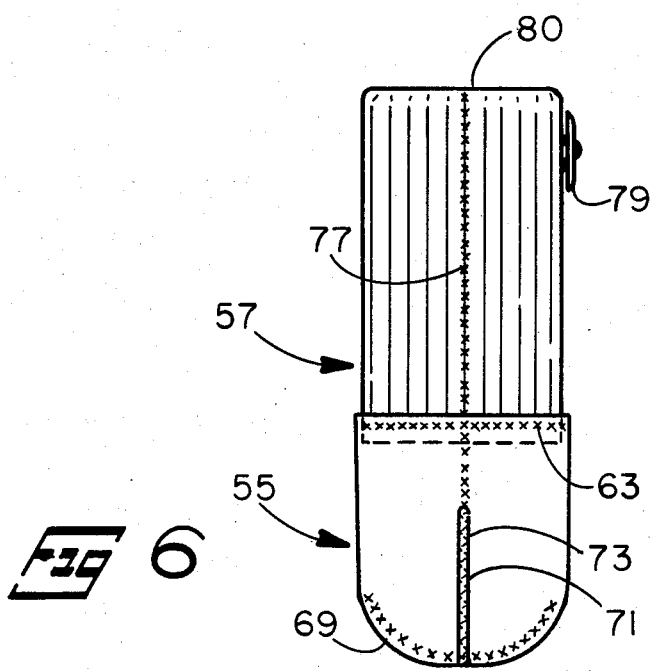
FIG. 6 is a front view of a modified bootee fabricated from the blank of FIG. 5.

As described, the bootee 5 is suitable for dogs with legs from about six inches to 19 inches in length. Toy-sized dogs, that is, small dogs having legs shorter than about six inches, require bootees 55 of slightly different construction, FIG. 6. Because of manufacturing considerations, it is not feasible to make bootees suitable for very small dogs with the full length sock 9 as shown in FIG. 3. Rather, referring to FIGS. 5 and 6, the sock 57 is of a relatively short length and has an open bottom. The sock 57 is not continuously knit into a tube, but it is fabricated from a flat piece of material 59 sewn to the top margin of boot blank 61 along stitch line 63. The boot blank 61 has generally tapered side edges 71 and a scalloped lower margin 67. The sock and boot blank are rolled together, and the upper portion of the edges 71 and the edges 75 of the sock blank 59 are sewn together by stitchings 77 in what will become an interior seam after turning. The unit is then turned from its inside out position and the edges 71 of the boot blank are sewn together in an exterior seam in the lower portion of the blank by stitchings 73. The lobes of the scalloped lower margin 67 of the rolled blank 61 are joined, as by sewing, along stitch lines 69. The small bootee 55 thus formed is warm and flexible, although it lacks the cloth lining provided by the sock 9 of bootee 5. A buckle 79 is fastened to the upper portion of the sock 57 by loops of thread tightly securing the center bar directly to the sock 57 and with the top most edge of the buckle 79 well below the top edge 80 of the sock 57 to prevent contact with the dog's leg.

Some breeds of dogs, as for example Whippets and, to a lesser extent, miniature Schnauzers, have sloping hindquarters. To prevent the suspender system 7 from sliding backward on the hindquarters, the suspender system 7 may include an optional securing strap 81, FIG. 1. The strap 81 may be fastened to the strap 47 and looped under front strap 43 for securing to a conventional dog collar, not shown.

The bootees 5 and 55 of the present invention are thoroughly acceptable to dogs. Even upon their first wearing, dogs ignore them and make no attempt to chew or remove them. Further, the protective footwear 3 does not hinder an animal's movements in any way; pets are free to function normally in all respects while wearing them. The bootees are readily removable from the suspender system for washing but are easily slipped on and removed from the dog as a single unit without disassembling.

Thus, it is apparent that there has been provided, in accordance with the invention, protective footwear for animals which fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Protective footwear for animals comprising:
   a. a plurality of bootees, each being an independent garment, adapted to fit over the feet and legs of an animal, each extending up the leg and terminating at a point above the knee, but below the legpit;
   b. a suspender system adapted to drape over the animal's back and having a strap end corresponding to each bootee; and
   c. fastening means attached to each bootee for receiving the corresponding strap end of the suspender system,
      so that the suspender system holds the bootees in place on the animal's feet and legs and also allows the animal full function.

2. The protective footwear of claim 1 wherein the suspender system comprises:
   a. a first strap having two ends and adapted to be draped over the animal's shoulders, the strap extending from the shoulders down the front legs and terminating adjacent the bootees covering the front feet and legs, each end being adjustably received in the fastening means of the corresponding bootee;
   b. a second strap having two ends and adapted to be draped over the animal's hindquarters, the strap extending from thc hindquarters down the hind legs and terminating adjacent the bootees covering the hnd feet and legs, each end being adjustably received in the fastening means of the corresponding bootee; and
   c. a longitudinal strap joined to the first and second straps and extending longitudinally along the back of the animal.

3. The protective footwear of claim 1 wherein the suspender system comprises two straps, each having two ends, crossing in an x configuration and fastened where one strap overlaps the other thus adapted to drape over the animal's back and having a strap end corresponding to each bootee.

4. The protective footwear of claim 1 wherein the suspender system comprises:
   a. a leash type walking harness encircling the animal's body for retaining it on the animal's body: and
   b. a strap corresponding to each bootee fastened to the harness, the free end of each strap being received within the fastening means on the corresponding bootee and being adjustable with respect to the corresponding bootee.

5. Protective footwear for animals comprising:
   a. a plurality of bootees adapted to fit over the feet and legs of an animal, each bootee having an open top flexible boot fabricated from a blank of material having a central panel having a lower margin and a pair of opposed side panels having lower margins, each side panel having an outside edge, the blank being rolled over and the outside edges of the side panels being joined together and the lower margins of the central panel and side panels being joined together, and a flexible sock inserted into and joined to the boot;

b. a suspender system adapted to drape over the animal's back and having a strap end corresponding to each bootee; and c. fastening means attached to each bootee for receiving the corresponding strap end of the suspender system, so that the blank is converted into an open top boot for receiving the sock.

6. The protective footwear of claim 5 wherein the blank material is deerskin, and wherein the blank is rolled such that a sueded side of the deerskin forms the exterior surface of the boot.

7. The protective footwear of claim 5 wherein the outside edges of the side panels converge toward the lower margins thereof, so that the completed boot tapers inwardly toward the bottom thereof to reduce the amount of folded boot material above the animal's toes.

8. The protective footwear of claim 5 wherein the lower margins of the blank are scalloped, so that the completed boot has a rounded contour at the toe to prevent the corners from catching and thus causing the animal to stumble.

9. The protective footwear of claim 5 wherein the sock is manufactured as a substantially rectangular blank of material having opposed outside edges and fastened to the blank of boot material before the boot blank is rolled, and wherein the respective opposed outside edges of the sock blank and boot blank are joined together along a common stitch line.

10. Protective footwear for animals comprising:

a. a plurality of bootees, each being an independent garment, adapted to fit over the feet and legs of an animal;

b. a suspender system adapted to drape over the animal's back and having a strap end corresponding to each bootee; and c. fastening means attached to each bootee for receiving the corresponding strap end of the suspender system, each fastening means being attached to the corresponding bootee at a location on the upper half thereof, so that slack in each suspender is minimized and the suspender system retains the bootees on the animal's legs and feet when the animal flexes its legs and feet.

11. The protective footwear of claim 10 wherein the suspender system comprises:

a. a first strap having two ends and adapted to be draped over the animal's shoulders, the strap extending from the shoulders down the front legs and terminating adjacent the bootees covering the front feet and legs, each end being adjustably received in the fastening means of the corresponding bootee, b. a second strap having two ends and adapted to be draped over the animal's hindquarters, the strap extending from the hindquarters down the hind legs and terminating adjacent the bootees cobering the hind feet and legs, each end being adjustably received in the fastening means of the corresponding bootee; and c. a longitudinal strap joined to the first and second straps and extending longitudinally along the back of the animal.

12. The protective footwear of claim 10 wherein the suspender system comprises two straps, each strap having two ends, the straps crossing in an x configuration and being fastened together where one strap overlaps the other thus adapted to drape over the animal's back and having a strap end corresponding to each bootee.

13. The protective footwear of claim 10 wherein the suspender system comprises:

a. a leash type walking harness encircling the animal's body for retaining it on the animal's body; and b. a strap corresponding to each bootee fastened to the harness, the free end of each strap being received within the fastening means on the corresponding bootee and being adjustable with respect to the corresponding bootee.

14. The protective footwear of claim 10 wherein the fastening means is attached to each bootee adjacent the top edge thereof.

15. The protective footwear of claim 10 wherein each bootee extends upwardly from the animal's foot to cover at least the knee and terminates at a point below the legpit.

16. The protective footwear of claim 15 wherein each bootee is fabricated from a flexible sock inserted into and permanently joined to an open top flexible boot.

* * * * *